O. G. RIESKE.
DOUBLE DISK ATTACHMENT FOR SEED DRILLS.
APPLICATION FILED JAN. 30, 1911.
1,050,172.
Patented Jan. 14, 1913.
2 SHEETS—SHEET 1.
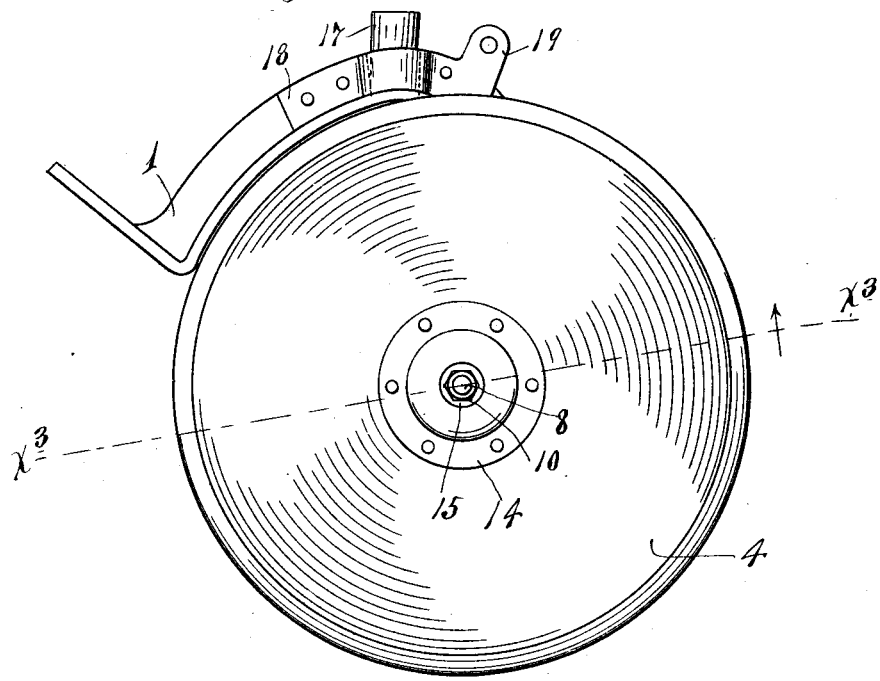
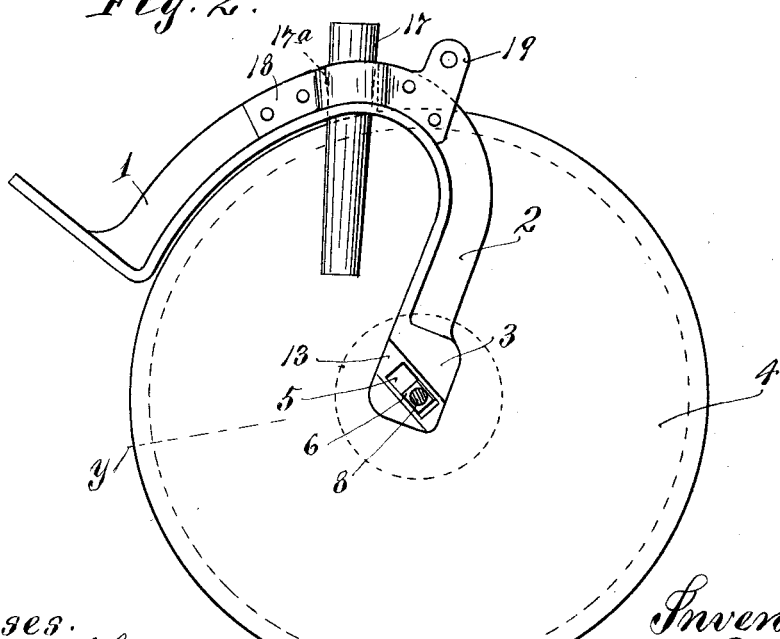

O. G. RIESKE.
DOUBLE DISK ATTACHMENT FOR SEED DRILLS.
APPLICATION FILED JAN. 30, 1911.
1,050,172.
Patented Jan. 14, 1913.
2 SHEETS—SHEET 2.
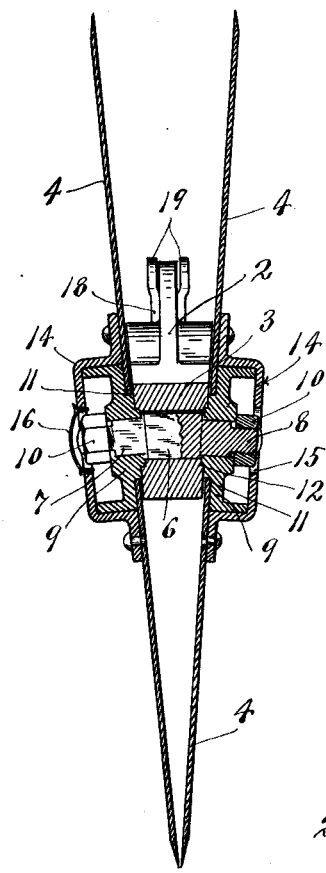
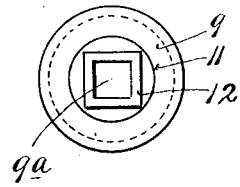
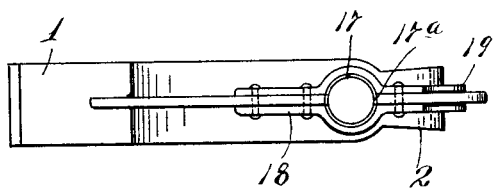
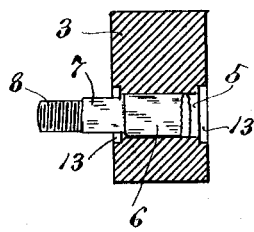
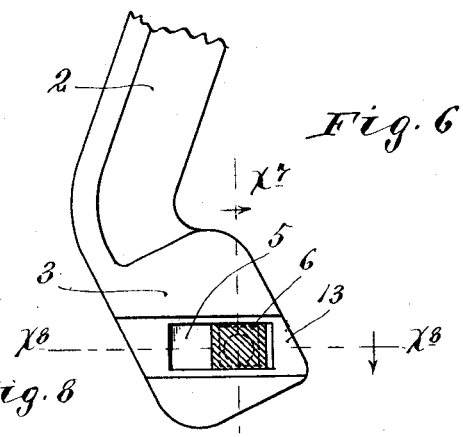
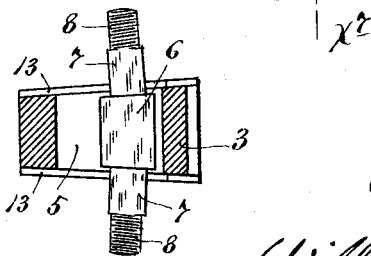
Witnesses
A. H. Opsahl.
Harry Opsahl.
Inventor
Otto George Rieske
By his Attorneys
Williamson Merchant

UNITED STATES PATENT OFFICE.

OTTO G. RIESKE, OF ST. LOUIS PARK, MINNESOTA.

DOUBLE-DISK ATTACHMENT FOR SEED-DRILLS.

1,050,172.  Specification of Letters Patent.  Patented Jan. 14, 1913.

Application filed January 30, 1911. Serial No. 605,455.

*To all whom it may concern:*

Be it known that I, OTTO G. RIESKE, a citizen of the United States, residing at St. Louis Park, in the county of Hennepin and State of Minnesota, have invented certain new and useful Improvements in Double-Disk Attachments for Seed-Drills; and I do hereby declare the following to be a full, clear, and exact description of the invention, such as will enable others skilled in the art to which it appertains to make and use the same.

My invention relates generally to furrow openers but has for its especial object the provision of an improved double disk attachment for seed drills.

To the above ends, the invention consists of the novel devices and combinations of devices hereinafter described and defined in the claims.

In a double disk attachment for drills, the disks, as is well known, are set at an angle to each other with their converging edges in contact, at the front of the disks, usually at a point not far from a horizontal line intersecting the axes of the disks. The angle of convergence of the disks is primarily that angle which best adapts the disks to open the furrow under a minimum of frictional resistance with the ground, hence, while it is desirable to adjust the disks from time to time, to compensate for diminution in size of the disks due to wear and thereby keep the front edges of the disks in, or approximately in contact, it is also highly desirable that this adjustment be accomplished without changing the initial and proper set angle of the disks in respect to each other and in respect to the line of draft. My present invention accomplishes these important results, and others which will hereinafter appear, by a very simple means and in a highly efficient manner.

A double disk attachment designed in accordance with the preferred arrangement of my present invention is disclosed in the drawings and defined in the claims.

In the drawings, like characters indicate like parts throughout the several views.

Referring to the drawings, Figure 1 is a view in side elevation showing the improved double disk attachment; Fig. 2 is a side elevation of the disk attachment with one of the disks removed, and with some parts sectioned; Fig. 3 is an approximately horizontal section taken on the line $x^3$ $x^3$ of Fig. 1, some parts being shown in full. Fig. 4 is a detail view in elevation looking at the inner face of one of the disk journal hubs; Fig. 5 is a plan view of the shoe of the attachment; Fig. 6 is a detail view showing the lower end of the shoe leg illustrating a slightly modified construction thereof; Fig. 7 is a vertical section taken on the line $x^7$ $x^7$ of Fig. 6; and Fig. 8 is a horizontal section taken on the line $x^8$ $x^8$ of Fig. 6.

The main, or segmental outer portion 1 of the boot and its depending leg 2 are preferably formed integral from a single piece of T-iron or steel. The front end portion of the segmental boot body 1 is shown as turned upward to adapt it to be bolted, riveted, or otherwise attached to a drag bar, not shown. The lower end of the leg 2 is upset, or otherwise formed with the foot portion 3 that is made wedge-shape approximately in horizontal cross-section and with the faces of the said foot converging forwardly.

The converging disks 4 are journaled to the foot 3 by means presently to be described, with their converging front edges in contact, preferably at the point marked $y$ in Fig. 2, and it is toward this point $y$ that the flat faces of the foot 3 converge.

In the foot 3 is an elongated slot 5 through which is passed a so-called trunnion bolt 6. The intermediate portion of this trunnion bolt 6 is angular in cross-section so that it can slide laterally but cannot rotate within the slot 5. The projecting ends of the bolt 6 extend at an angle to each other and project from the foot 3, each at a slight angle to the plane of the adjacent flat surface of the said foot. The projecting parts of said bolt 6 are formed with square portions 7 and threaded end portions 8.

Journal hubs 9 are provided with square seats 9ª that fit the square portions 7 of the bolts 6 and are rigidly but adjustably clamped to the foot 3 by nuts 10 on the threaded ends of the said bolt. At their inner faces, the journal hubs 9 are provided with annular shoulders 11 that afford bearings upon which the disks 4 directly rotate, and each hub 9 is further provided on its inner face with a shouldered projection 12 that fits and slides in the shallow groove 13 formed in the adjacent face of the foot 3. In this way the journal hubs 9 are mounted for adjustments longitudinally of the slots 5, but are held against rotation. Secured by rivets or otherwise, on the outer face of each disk 4 is a journal cap or outer bearing hub 14 that incloses and rotatively engages with the coöperating journal hub 9. As shown, these caps 14 are provided with axial perforations 15 which afford access to the nuts 10, and which may, and usually will be temporarily closed by friction held plugs 16.

In Figs. 6 and 7, the slots 5 and channels 13 are shown as approximately horizontally extended. With this arrangement, when the disks are diminished in size by wear so that their converging front edges separate, the disk journals may be adjusted forwardly in the slot 5, from time to time, so as to always keep the said front converging edges of the disks in contact. Also, this adjustment is accomplished by moving the disks in the planes of their initial convergence, or in other words, without changing the initial or predetermined set angularity of the disks in respect to each other and in respect to the line of draft.

In the construction illustrated in Figs. 1 to 5 inclusive, and as best shown in Fig. 2, the slot 5 and channel 13 extend upwardly toward the intermediate portion of the segmental body of the boot 1, and at an acute angle to a line drawn from the point $y$ through the axes of the disk journals. With this arrangement, when the disk journals are adjusted upwardly in the slot 5, the upper forward edges of the disks will be carried close to the segmental boot and the disk journals will also be carried forwardly and nearer to the said point $y$, to-wit, toward the point of initial contact between the front edges of the disks. This adjustment, therefore, accomplishes two important things, to-wit, it serves to maintain contact between the converging front edges of the disks, to compensate for diminution in size of the disks due to wear, and it keeps the upper front edge portions of the disks always close to the segmental body of the boot, even when the disks are reduced in size by wear.

The improved means herein disclosed for keeping the converging edges of the disks in contact when reduced in size by wear, is free from all springs or spring elements and requires no parts to be bent or strained out of normal shape to accomplish the desired adjustment of the disk journals; and furthermore, as already stated, the initial and proper predetermined divergence of the disks in respect to each other and to the line of draft is always maintained.

Preferably, the boot, including its leg, is made from a commercial steel T-bar bent approximately in the form shown in the drawings. When the disk attachment is used in connection with a disk drill or seeding machine, the seed delivery spout, 17, will preferably be passed through quite a large passage $17^a$ formed by cutting a hole through the said boot in such a manner that its vertical intermediate web is cut in two at that point. To reinforce the boot surrounding the passage $17^a$, a pair of reversely bulged reinforcing metal straps 18 are applied and riveted to the said vertical boot web, as best shown in Figs. 2 and 5. These reinforcing straps 18 increase the depth of the passage 17 and keep the boots stronger where they are applied than at any other point. Also, preferably, the rear ends of the straps 18 are upwardly extended and perforated to afford a pair of laterally spaced lugs 19 to which the usual or any suitable pressure connection, not shown, may be applied.

It will be noted that the seed spout 17 is located for delivery of the seed to the ground at a point in front of the axes of the disks, at which point the edges of the disks move downward. The point of delivery of the seed to the ground will be approximately at the point marked $y^1$ in Fig. 2, and it is important to note that at this point, and in fact at any point in front of a vertical line intercepting the axes of the disks, the disks, regardless of the adjustments above noted to compensate for wear of the disks, always maintain a constant spread or distance between them. In making this statement, it is assumed that the point $y^1$ remains stationary in respect to the boot 1 and in respect to the original or initial location of the axes of the disks and that the disks are adjusted forwardly in respect thereto. With this means of adjustment therefore a constant width of furrow at the point of delivery of the seed thereinto is maintained and this, as is obvious, is of importance, as a predetermined width of furrow is desired. The only variation in the space between the disks, due to wear thereof, and the adjustments noted, is at the rear edges of the disks, but this variation is not important because it does not vary the width of the furrow at the point where the seed is dropped into the ground.

What I claim is:

1. A furrow opener comprising a boot and a pair of converging flat disks journaled thereto with their converging edges in close proximity to the upper portion of the boot, the said disks being adjustable toward the boot in their planes of initial convergence, to maintain the converging edges of the disks in close proximity to the upper portion of the boot and to compensate for diminution of the size of the disks due to wear, without changing the angle of convergence of the disks.

2. A furrow opener comprising a boot and a pair of flat converging disks normally set for contact at their converging edges, said converging edges being in close proximity to the upper portion of the boot, the said disks having journals that are adjustable toward and from the boot and the point of initial contact of said disks, to thereby compensate for diminution in size of the disks due to wear, to maintain the upper forward edges of the disks in close proximity to the upper portion of the boot and to maintain contact between the converging edges of the disks without changing the angle of convergence of the disks.

3. A furrow opener comprising a seed boot and converging disks journaled thereto with their converging edges in close proximity to the upper portion of the boot, the said boot having converging faces adjacent to the disks and the disk journals being adjustable toward the boot in respect to said converging faces, to compensate for diminution in the size of the disks due to wear to maintain the upper forward edges of the disks in close proximity to the upper portion of the boot and to maintain contact of the converging edges of the disks, without changing the angle of the divergence thereof.

4. A furrow opener comprising a boot, converging flat disks, and journals connecting said disks to said boot so that the converging edges of said disks will be in close proximity to the upper portion of the boot, the axes of said disks being at an angle to each other, and said journals being slidably adjustable on and in the direction of the said boot, and toward the contacting edges of the disks, to thereby compensate for diminution in size of the disks due to wear, to maintain contact between the converging edges of the disks, and to maintain the converging edges of the disks in close proximity to the upper portion of the boot without changing the angle of divergence of the disks.

5. A furrow opener comprising a seed boot formed with a wedge-shaped forwardly converging extremity and an elongated slot therein, of a trunnion bolt extended through and laterally adjustable in said slot, converging flat disks journaled to the wedge shaped portion of said shoe, by said trunnion bolt and adjustable thereon and bodily adjustable therewith in respect to the shoe in the planes of their initial convergence, to thereby compensate for diminution in the size of the disks due to wear and to maintain contact between the converging edges of the disks, without changing the angle of divergence of the disks.

6. In a furrow opener, the combination with a seed boot having a segmental outer portion and a depending leg portion, of converging flat disks journaled to the leg of said boot with their converging edges in close proximity to said segmental outer portion, said disks being adjustable bodily in the planes of their initial convergence, in a direction which is both toward the segmental outer portion of said boot and toward the contacting edges of the disks, to thereby compensate for diminution in the size of the disks due to wear and to maintain contact between the converging edges of the disks and to keep the edges of the disks close to said segmental outer portion of said seed boot, all without changing the angle of convergence of the disks.

7. The combination with a seed boot and a pair of converging disks journaled thereto, of means for delivering the seed into the furrow between the disks, and means for adjusting said disks forwardly and upwardly in respect to the point of delivery of the seed to compensate for diminution in size due to wear, and for maintaining a constant distance between the converging edges of the disks and the boot.

8. The combination with a boot and a pair of converging disks journaled thereto, of means for delivering the seed into the furrow at a point in front of the axes of the disks, and means for adjusting the said disks forwardly and upwardly in respect to the point of delivery of the seed to compensate for diminution in size thereof due to wear, and for maintaining a constant distance between the edges of the disks and the seed boot.

9. The combination with a seed boot and a pair of converging disks journaled thereto, of means for delivering the seed into the furrow between the disks, and means for adjusting said disks in the planes of their initial convergence and in a forward and upward direction in respect to the point of delivery of the seed, to compensate for diminution in size due to wear, without changing the angle of the disks and without varying the spacing between the converging edges of the disks and the seed boot.

10. A seed boot for disk drills formed from a metal T-bar bent to afford a depending leg, to which latter disks are adapted to be journaled, the said boot having a seed spout passage cut through its vertical flange, and reinforcing strips riveted to the said vertical flange and bulged in alinement with the said seed spout passage.

11. A seed boot for disk drills formed from a metal T-bar bent to afford a depending leg, to which latter disks are adapted to be journaled, the said boot having a seed spout passage cut through its vertical flange, and reinforcing strips riveted to the said vertical flange and bulged in alinement with the said seed spout passage, and the said reinforcing strips at their rear ends having upwardly projecting ears for connection to pressure devices, substantially as described.

12. The combination with a seed boot formed from a metal T-bar bent to afford a depending leg, of a seed delivery spout extended through a passage in the said seed boot in front of the leg thereof, and reinforcing strips secured to the vertical flange of said boot and embracing the said seed spout, substantially as described.

13. A furrow opener comprising a seed boot and a pair of converging flat disks journaled thereto, the said disks being adjustable in their planes of initial convergence to compensate for diminution of the size of the disks due to wear without changing the angle of convergence of the disks, and a seed delivery spout extending through the top or crown of the seed boot and arranged to deliver the seed in front of the disk axis.

In testimony whereof I affix my signature in presence of two witnesses.

OTTO G. RIESKE.

Witnesses:
F. D. MERCHANT,
HARRY D. KILGORE.